United States Patent
Hsu et al.

(10) Patent No.: US 9,463,576 B2
(45) Date of Patent: Oct. 11, 2016

(54) GUIDED CUTTING RETAINER FOR ELONGATED STACK SET

(71) Applicant: Ching Feng Home Fashions Co., Ltd., Changhua (TW)

(72) Inventors: Chun-Jan Hsu, Changhua (TW); Hsien-Te Huang, Taipei (TW)

(73) Assignee: CHING FENG HOME FASHIONS CO., LTD., Changhua (TW)

( * ) Notice: Subject to any disclaimer, the term of this patent is extended or adjusted under 35 U.S.C. 154(b) by 186 days.

(21) Appl. No.: 14/517,391

(22) Filed: Oct. 17, 2014

(65) Prior Publication Data
US 2015/0321367 A1    Nov. 12, 2015

(30) Foreign Application Priority Data

May 9, 2014   (TW) .............................. 103208217 U (51) Int. Cl.
| | |
|---|---|
| *B43L 5/00* | (2006.01) |
| *B26B 29/06* | (2006.01) |
| *B23Q 3/06* | (2006.01) |
| *B23Q 9/00* | (2006.01) |
| *B26D 7/02* | (2006.01) |
| *E06B 9/266* | (2006.01) |

(52) U.S. Cl.
CPC ................ *B26B 29/06* (2013.01); *B23Q 3/061* (2013.01); *B23Q 9/0078* (2013.01); *B26D 7/02* (2013.01); *E06B 9/266* (2013.01)

(58) Field of Classification Search
USPC .................. 269/87.2, 58, 66, 74, 84, 91, 134
See application file for complete search history.

(56) References Cited

U.S. PATENT DOCUMENTS

| | | | | | |
|---|---|---|---|---|---|
| 1,157,520 | A | * | 10/1915 | Fischer ................... | B26B 29/06 74/126 |
| 4,195,827 | A | * | 4/1980 | Lyman ................. | B23D 51/025 269/2 |
| 4,457,053 | A | * | 7/1984 | Niwa ....................... | F16G 11/00 24/304 |
| 4,557,024 | A | * | 12/1985 | Roberts ................. | F16L 33/035 24/16 R |
| 4,663,807 | A | * | 5/1987 | Bozzo ................ | B65D 33/1675 24/16 PB |

(Continued)

FOREIGN PATENT DOCUMENTS

| | | | |
|---|---|---|---|
| DE | 1060848 A1 * | 12/2000 | ............. B26B 29/06 |
| TW | 090208659 | 7/2002 | |

(Continued)

*Primary Examiner* — Alvin Grant
(74) *Attorney, Agent, or Firm* — Muncy, Geissler, Olds & Lowe, P.C.

(57) ABSTRACT

A guided cutting retainer for an elongated stack set is provided. During a cutting process of an end length of the stack set, the guide cutting retainer keeps end sides of layers of the stack neat and aligned. The guide cutting retainer includes a capped sleeve having a cross-section of a frame and formed with an internal longitudinal through opening. One end of the opening is combined to a U-shaped pedestal. A cut groove is reserved between the U-shaped pedestal and the opening. The U-shaped pedestal can be wedged and fastened with a pressing and positioning frame to provide a wedging effect. Thus, the pressing and positioning frame secures the stack set to fix its end side to form a complete blade-feeding guide groove for guiding the cutting process. The cutting process yields an aligned result further with intervention of a ruler board of an end sealing ruler.

7 Claims, 7 Drawing Sheets

(56) References Cited

U.S. PATENT DOCUMENTS

| | | | | |
|---|---|---|---|---|
| 5,103,702 A * | 4/1992 | Yannazzone | ........... | B23D 23/00 83/29 |
| 5,240,209 A * | 8/1993 | Kutsch | ................... | F16G 13/16 248/49 |
| 5,339,716 A * | 8/1994 | Sands | .................... | E06B 9/266 29/24.5 |
| 5,358,024 A * | 10/1994 | Schwaegerle | ........... | E06B 9/386 160/236 |
| 5,473,796 A * | 12/1995 | Fusillo | ............... | B65D 33/1675 24/30.5 R |
| 5,689,860 A * | 11/1997 | Matoba | .................. | F16G 11/00 24/115 F |
| 5,725,185 A * | 3/1998 | Auclair | .................... | F16L 3/12 248/73 |
| 6,106,189 A * | 8/2000 | Seale | .................... | F16B 7/0493 248/230.3 |
| 6,220,554 B1 * | 4/2001 | Daoud | ..................... | F16L 3/12 24/16 PB |
| 6,334,379 B1 * | 1/2002 | Sudano | .................. | B23D 23/00 29/24.5 |
| 6,355,887 B1 * | 3/2002 | Gretz | ...................... | F16L 3/233 174/135 |
| 6,427,571 B1 * | 8/2002 | Hsu | ........................ | B23D 47/04 29/24.5 |
| 6,966,353 B2 * | 11/2005 | Hsu | .......................... | E06B 9/38 160/168.1 R |
| 2001/0054338 A1 * | 12/2001 | Marocco | ................ | B23D 23/00 83/13 |
| 2005/0188515 A1 * | 9/2005 | Reimer | .................. | B23D 33/08 29/24.5 |
| 2015/0197982 A1 * | 7/2015 | Lee | ......................... | E06B 9/266 83/464 |

FOREIGN PATENT DOCUMENTS

| | | |
|---|---|---|
| TW | 091209142 | 6/2003 |
| TW | 090129596 | 8/2003 |
| TW | 102203513 | 10/2013 |

\* cited by examiner

GUIDED CUTTING RETAINER FOR ELONGATED STACK SET

BACKGROUND OF THE INVENTION a) Field of the Invention

The invention relates in general to a guided cutting retainer for neatly cutting an end side of an elongated stack set.

b) Description of the Prior Art

Figure 1:
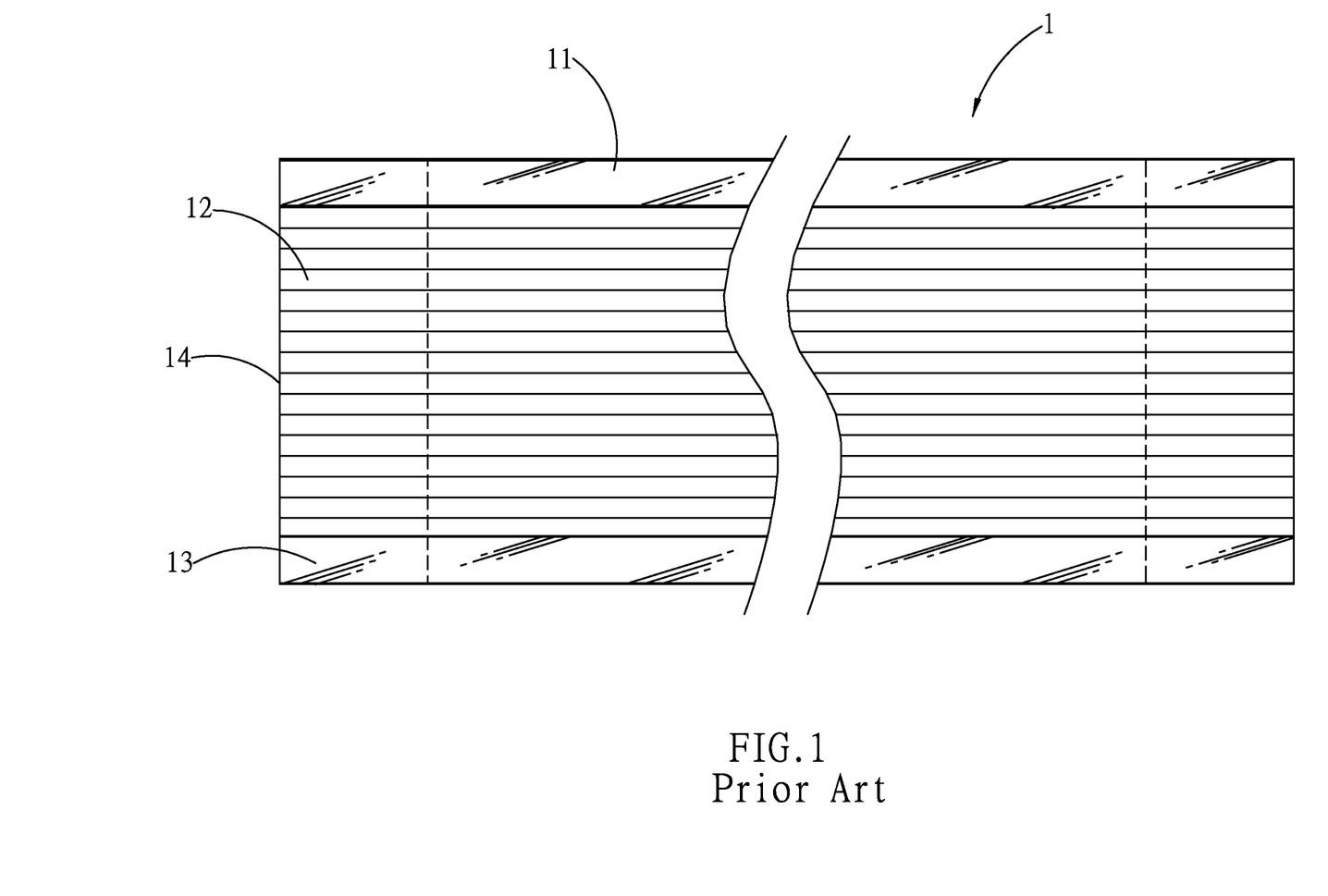
FIG. 1 is a front view of a common stacked stack curtain set.

Referring to FIG. 1, take a curtain set as an example of a stack set. To form a stack curtain set 1, stacked stats 12 are accumulated and clamped between an upper truss rail 11 and a lower truss rail 13. The length of the stack curtain set 1 needs to appropriately adapt to the width of a window to be applied to. If the length excessively exceeds the width of the window, the size of the slats needs to be adjusted by symmetrically cutting the two ends of the slats to obtain an appropriate length that adapts to the window to be applied to. The cutting process may be performed by measuring cutting lines and cutting by any cutting tools. If the cutting process is manually carried out, generally by a saw blade, to ensure an equal length and neat end faces throughout the stack curtain set 1 after cutting, it is essential that end sides 14 of the stack curtain set 1 be secured to prevent deformation caused by sliding movements of the stack slats 12.

To cut sizes of end sides of a stack set, such as commonly cutting stacked pieces of paper, cutting an elongated plate-like stack, or cutting left and right lengths of a curtain of a curtain set, for example, the curtain set is first piled into a stack set before the cutting process. There are large-scale industrial production tools for cutting curtain sets. In these industrial production tools, in response to different operating conditions, different speed requirements, different cutting applications, numerous mechanism designs having a decompression method involving hydraulics, electronics or lever arms or saws for cutting different forms are provided. The Taiwan serial No. 090129596 discloses an industrial cutting apparatus for Venetian blinds. The above cutting apparatus achieves quick cutting by manual operations through a leveraged method. The Taiwan serial No. 102203513 discloses a curtain cutting apparatus that provides an industrial cutting design implemented by electromechanical operations. With electromechanical kinetic energy, a cutting tool is driven to cut a curtain and to yield an industrial effect. The Taiwan serial No. 090208659 discloses a trimmer that incorporates a hand tool machine and a manual operation. A guide channel for axial movements of an electronic chainsaw is provided at a linear position above a cutting line. The guide channel serves for guiding purposes to provide a working line of the chainsaw with a precise path. The Taiwan serial No. 091209142 further discloses an auxiliary toolkit for cutting a curtain upper beam. The toolkit is longitudinally provided with a hole for the curtain upper beam to pass through, and a longitudinal cut groove vertically provided at a lateral cross-section position. With the guidance of the longitudinal cut groove, a saw blade is provided with a precise cutting path for household uses. However, not only all of the above disclosures require electricity that accounts for a cost issue, none of the above disclosures has a design applicable to cutting end sides of an entire curtain set.

SUMMARY OF THE INVENTION

A primary object of the present invention is to provide a guided cutting retainer for DIY (Do It Yourself) purposes. During a cutting process of a curtain set, the guided cutting retaining guides a saw blade and prevents relative sliding movements between stacked slats by binding end sides of the curtain stack set along a stack direction, thereby achieving precise and neat cutting results.

To achieve the above object, a guided cutting retaining of the present invention includes a capped sleeve formed with an opening therein. The opening is longitudinally in communication with a U-shaped pedestal. The U-shaped pedestal can be wedged and fastened by a pressing and positioning frame in a top-bottom manner. By fastening the U-shaped pedestal with the pressing and positioning frame, end sides of the curtain stack set are prevented from sliding movements in between the stack. Further, a blade-feeding guide groove is formed between the opening and the U-shaped pedestal. Further, two guide sides respectively provided between the pressing and positioning frame and the U-shaped pedestal are aligned along a cutting direction.

In one embodiment, a spindle hole and an insertion slot in sequence are respectively disposed in a vertical symmetrical manner at an upper plate and a lower plate of the capped sleeve. After being vertically penetrated by an end sealing ruler, an end side of the curtain stack set is closely aligned to a plane. Further, most spindle holes may select different cutting sizes.

In one embodiment, the pressing and positioning frame and the U-shaped pedestal may achieve top-bottom relative movements to be wedged and fastened to each other, or disengaged from each other by similar top-bottom relative movements.

In one embodiment, the pressing and positioning frame and the U-shaped pedestal may be wedged and fastened to each other, and disengaged from each other along a horizontal direction.

The above and other aspects of the invention will become better understood with regard to the following detailed description of the preferred but non-limiting embodiments. The following description is made with reference to the accompanying drawings.

DETAILED DESCRIPTION OF THE PREFERRED EMBODIMENTS

The above and other aspects of the invention will become better understood with regard to the following detailed description of the preferred but non-limiting embodiments. The following description is made with reference to the accompanying drawings.

Figure 2:
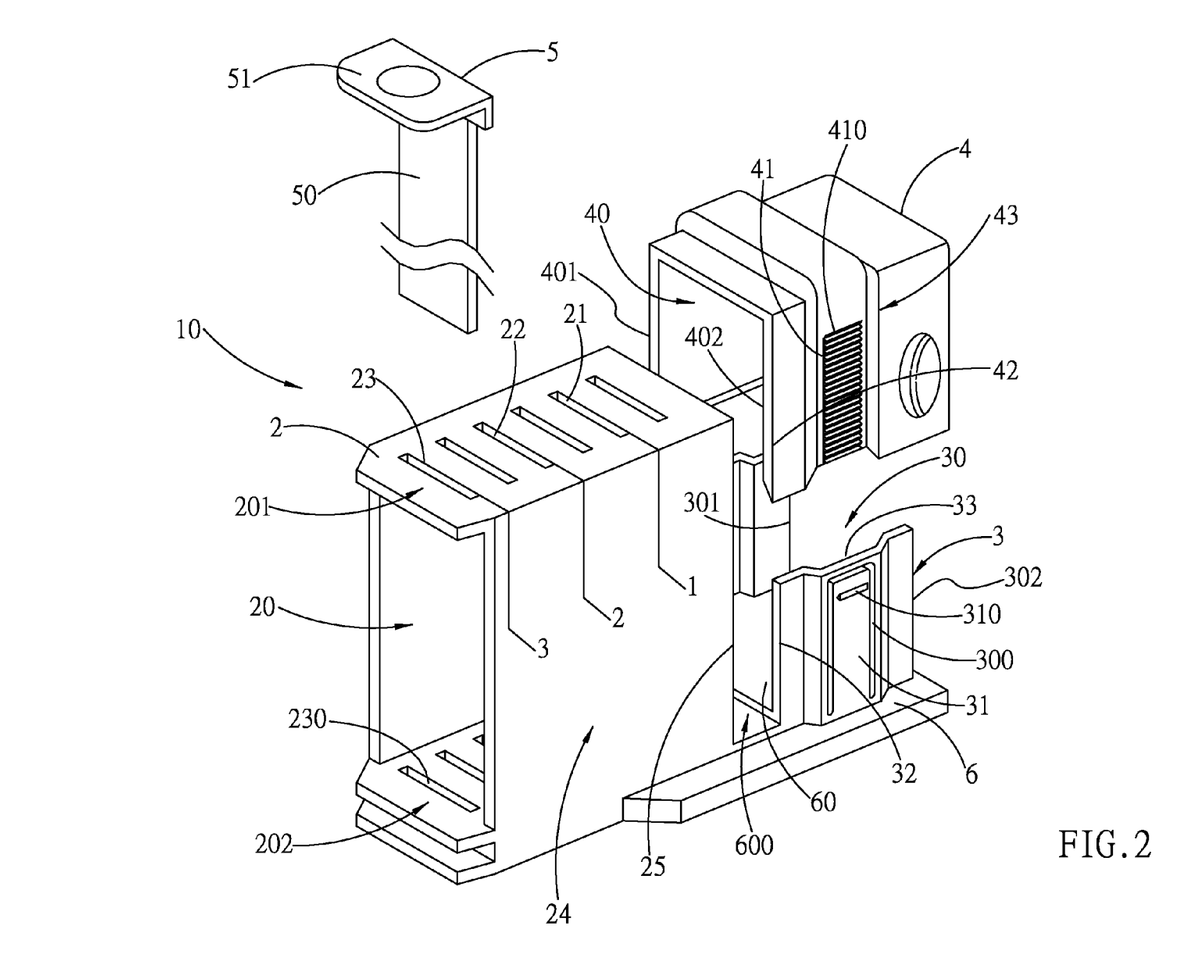
FIG. 2 is an elevation view of a guided cutting retainer according to an embodiment of the present invention.

Referring to FIG. 2, an auxiliary guided cutting retainer 10 for cutting an end side of a curtain stack set is provided by the present invention. The guided cutting retainer 10 includes a capped sleeve 2 penetrated through by an opening 20. The opening 20 has an upper plate at the top, a lower plate at the bottom, and frame plates at the two sides. The upper plate, the lower plate and the side plates form a rectangular through space, which may be penetrated by a side end of a stack curtain set 1 (referring to FIG. 3) having a rectangular cross-section. A U-shaped pedestal 3 is indirectly combined to a cut groove 600 that is laterally provided subsequent to the opening 20. The U-shaped pedestal 3 has a mouth 30 formed therein for aligning with the opening 20. The U-shaped pedestal 3 is formed by a vertical plate 301 and a vertical plate 302 facing each other. An upper end of the U-shaped pedestal 3 is disposed with a fastening tooth 310 capable of producing a flexible displacement. Preferably, the displacement is supported by a flexible plate 31. The flexible plate 31 is formed from cutting a breadth surface of the vertical plate 302 through a cut slit 300 of the U-shaped pedestal 3, and has a free end capable of receiving flexible stress. The bottom of the U-shaped pedestal 3 is fixed by a base plate 6, and is combined to the bottom of the capped sleeve 2. A pressing and positioning frame 4, having a cross-section similar to an inverted U shape, includes cross plates 401 and 402 at its two sides, respectively, an internal cross space forming a cross chamber 40, with planar angles of the cross plates 401 and 402 corresponding to the two vertical plates 301, 302 of the U-shaped pedestal 3, and a plurality of arrayed teeth 410 horizontally provided at positions corresponding to the fastening tooth 310 of the U-shaped pedestal 3. A top-bottom sequence of the arrayed teeth 410 form a vertical tooth row 41. When the pressing and positioning frame 4 is wedged and fastened into the U-shaped pedestal 3, each of the arrayed teeth 410 of the top-bottom sequence tooth row 41 is hooked and fastened by the fastening tooth 310 of the U-shaped pedestal 3. The hooked fastening effect is to limit a height change of the pressing and positioning frame 4 to cause the limiting condition to provide a downward locking force. Further, inner sides of the vertical plates 301, 302 at the two sides of the U-shaped pedestal 3 are provided with arch grooves 33. The arch grooves 33 allow up and down linear movements of the cross plates 401 and 402 of the pressing and positioning frame 4, and a protruding arch plate 43 is slidably installed at a relative path. With the vertically linear coordination of the protruding arch plate 43 and the recessed arch grooves 33 of the U-shaped pedestal 3, the pressing and position frame 4 having been assembled is not vertically deformed. Further, guide sides 42 of the pressing and positioning frame 4 and the guide sides 32 of the U-shaped pedestal 3 are aligned at the same cross section to form a complete blade-feeding guide groove 60. The blade-feeding guide groove 60 is formed by guide sides 25 of the capped sleeve 2, guide sides 32 of the U-shaped pedestal 3 passing a cut groove 600, and the guide sides 42 of the pressing and positioning frame 4. Further, a spindle hole 201 and a corresponding vertical insertion slot 202 may be provided at positions of the upper and lower plates of the capped sleeve 2. The spindle hole 201 and the insertion slot 202 are in vertical alignment, and can be penetrated by a ruler board 50 of an end sealing ruler 5. A working end of the end sealing ruler 5 is operated by a user to have the ruler board 50 to be penetrated through the spindle hole 201, such that a lower end of the ruler board 50 is inserted into the insertion slot 202 to form a lateral blocking effect for blocking an end of the opening 20.

According to the form of the spindle hole 201, the top plate of the opening 20 may be sequentially provided with a plurality of spindle holes, such as a first spindle hole 21, a second spindle hole 22 and a third spindle hole 23. According to the above sequential spindle holes 201, the lower plate may be sequentially provided with third insertion slots 230 that correspond to the above sequential spindle holes 201. Taking the first spindle hole 21 as the above sequential spindle hole 201, the first spindle hole 21 may extend into an indication line. For example, if a distance between a longitudinal distance of the first spindle hole 21 and a guide side 25 is 1 inch, the corresponding scale may be marked as "1". Similarly, the position of the second spindle hole 22 is 2 inches, and the scale is marked as "2"; and the longitudinal distance of the third spindle hole 23 is 3 inches away from the guide side 25. With the intervention of the ruler board 50 of the end sealing ruler 5, the three positioned sizes above are obtained by using the inner breadth of the ruler board 50 of the end sealing ruler 5 and the guide side 25. When a processed stack set is inserted via the mouth 30 of the U-shaped pedestal 3, the end side of the stack set is abutted and aligned against the inner breadth of the ruler board 50 of the end sealing ruler 5.

Figure 3:
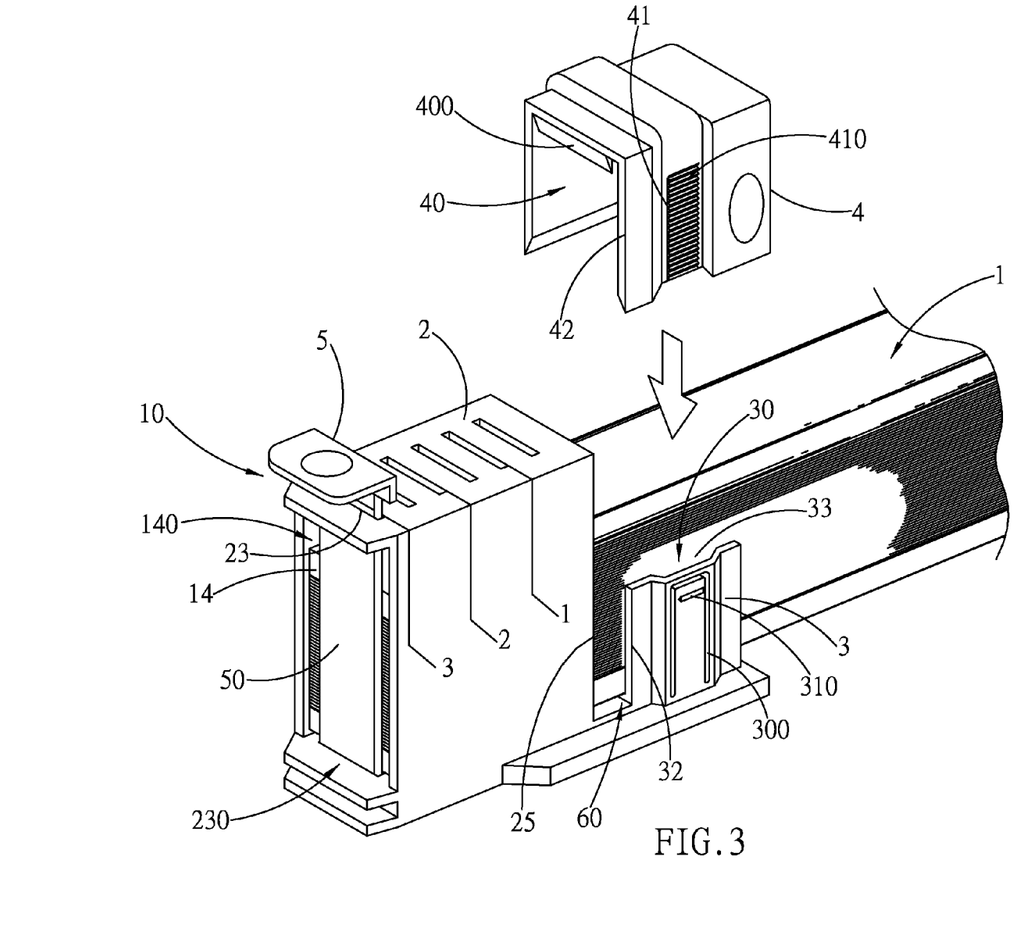
FIG. 3 is a schematic diagram of a preparatory state for cutting according to an embodiment of the present invention.

Details of applying the guided cutting retainer 10 of the present invention are given with reference to FIG. 3 below. The end sealing ruler 5 is first inserted to the third insertion slot 230 via the third spindle hole 23 to position the ruler board 50. The stack curtain set 1 is correspondingly penetrated through the mouth 30 of the U-shaped pedestal 3, and pressed and aligned at the inner breadth of the ruler board 50, such that an end side 14 is rubbed to achieve alignment. The cross chamber 40 of the pressing and positioning frame 4 is placed across above the stack curtain set 1 and pressed and fastened downwards toward the U-shaped pedestal 3. The arrayed teeth 410 disposed at the guide sides 42 of the pressing and positioning frame 4 are then fastened with the fastening tooth 310 of the U-shaped pedestal 3. The pressing and positioning frame 4 is again tightly pressed in the aim of obtaining an ultimate fastened state. The fastened state forms a limit on a height position of the pressing and positioning frame 4. Such limit generates a locking force on an upper surface of an opposite position of the stack curtain set 1, thereby producing a pressing force on a stacked relationship at one end of the stack curtain set 1 to be cut. The pressing force secures the stack curtain set 1 in a way that stacked slats do not slide during the cutting process.

Figure 4:
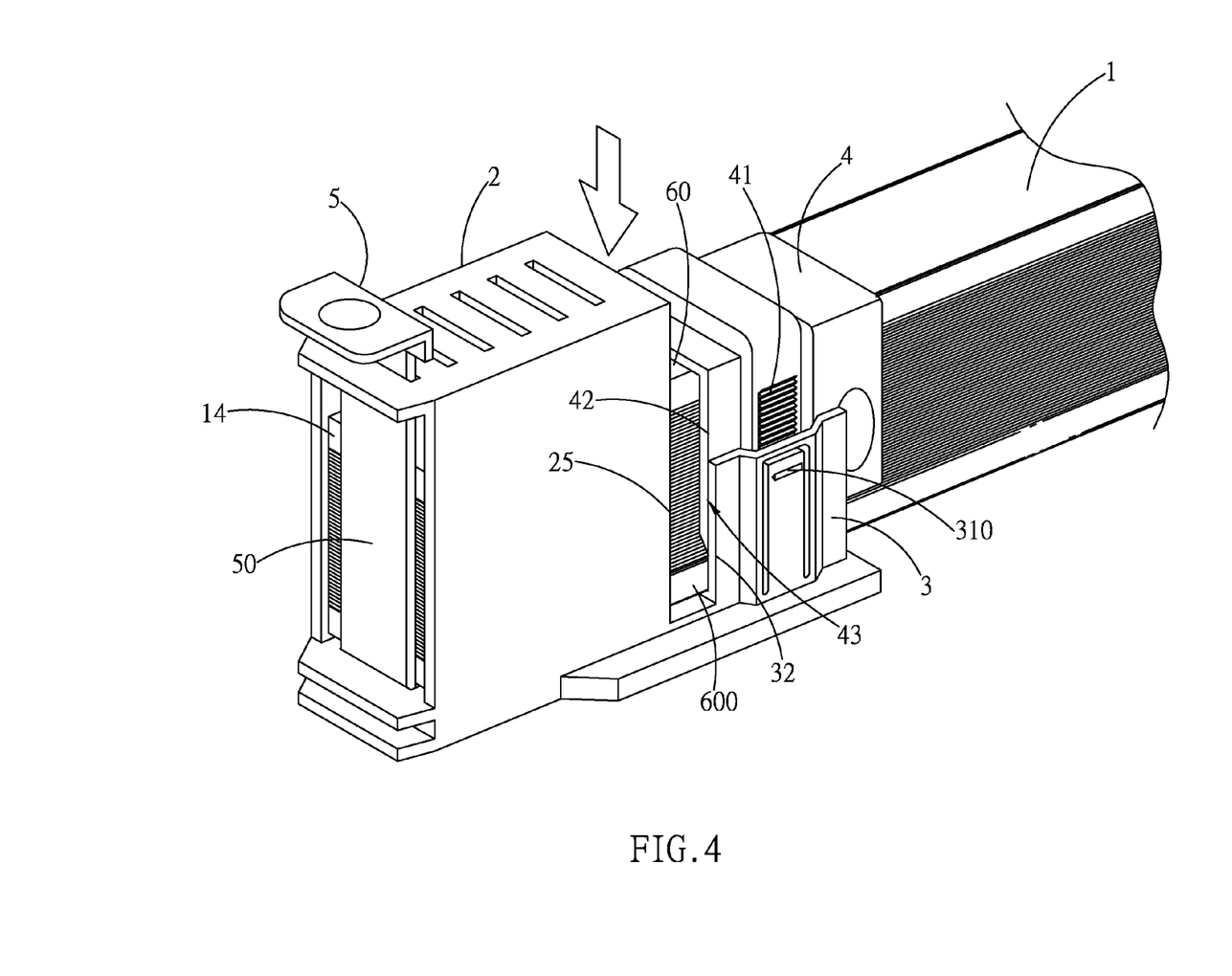
FIG. 4 is another schematic diagram of a preparatory state for cutting according to an embodiment of the present invention.

As shown in FIG. 4, when the pressing and positioning frame 4 is pressed downwards, and wedged and fastened to the U-shaped pedestal 3 at the height, and the tooth rows 41 of the pressing and positioning frame 4 are fastened by the fastening tooth 310 of the U-shaped pedestal 3, the pressing and positioning frame 4 is secured. A linear layout of the blade-feeding guide groove 60 is formed by the guide side 25 of the capped sleeve 2, the guide sides 32 of the U-shaped pedestal 3 and the guide sides 42 of the pressing and positioning frame 4. With the guide of the blade-feeding guide groove 60, a saw blade is allowed to enter from top to bottom via the opening of the blade-feeding guide groove 60. By utilizing the vertical linear guiding relationship of the blade-feeding guide groove 60, the saw blade is enabled to precisely cut along a blade-feeding line in a linear and vertical manner during the cutting process. Further, during the cutting process, a corresponding section of the stack curtain set 1 is pressed and positioned by the fastening force between the pressing and positioning frame 4 and the U-shaped pedestal 3. With the intervention the end sealing ruler 5 on the capped sleeve 2, the end side 14 of the stack curtain set 1 may be leaned and aligned at the inner breadth of the ruler board 50 of the end sealing ruler 5 to obtain an alignment reference. Thus, during the cutting process, the stack relationship of the stack curtain set 1 is assisted and prevented from longitudinal sliding movements to achieve precise cutting along a vertical line. For example, the cutting tool may be implemented by a saw blade such as a common long saw blade. The entering saw blade eventually falls at the bottom of the blade-feeding guide groove 60. For example, the bottom of the blade-feeding guide groove 60 may be made of a hard material to prevent being damaged by a blade of the cutting tool.

Figure 5:
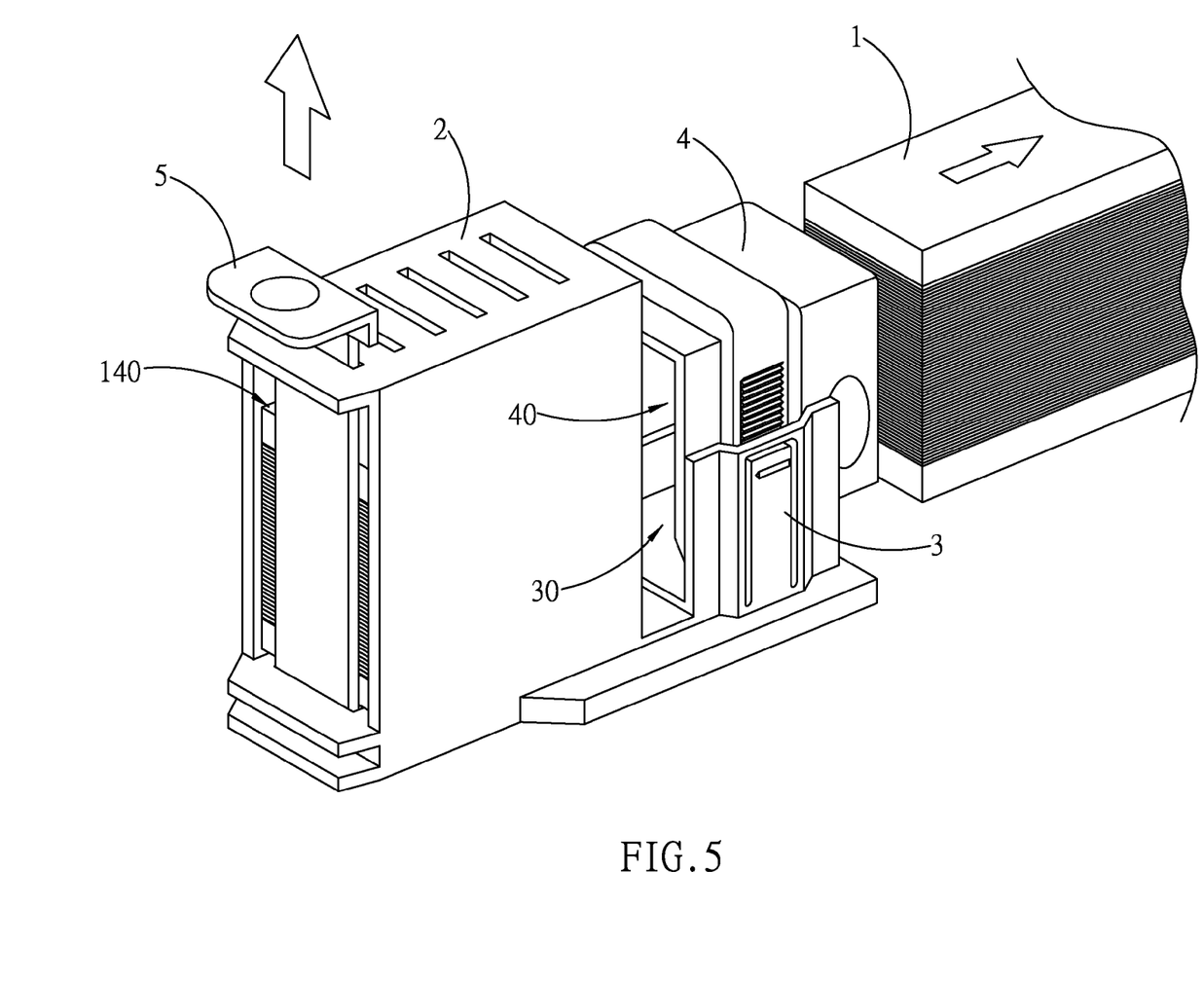
FIG. 5 is a schematic diagram of a state disengaged from a stack curtain set after cutting according to the present invention.

Referring to FIG. 5, a cut section 140 removed from the stack curtain set 1 is temporarily located in the capped sleeve 2. One obtained end of the stack curtain set 1 is pulled backwards along a longitudinal line. As the top-bottom pressing force exists between the pressing and positioning frame 4 and the U-shaped pedestal 3, a component force of a longitudinal horizontal force for pulling away the obtained end of the stack curtain set 1 is relatively small even the pressing and positioning frame 4 is wedged and fastened with the U-shaped pedestal 3. Further, due to smooth surfaces of upper and lower surfaces of the stack curtain set 1, the obtained end of the stack curtain set 1 can be disengaged. Given a sufficient frictional force between surfaces of the pressing and positioning frame 4 and the U-shaped pedestal 3 that secure the upper and lower surfaces of the stack curtain set 1, the other end of the stack curtain set 1 may also be rotated up or down at an angle to form a leverage effect to generate a large force for disengaging the pressing and positioning frame 4. Under any locked conditions of the pressing and positioning frame 4, the stack curtain set 1 can be readily longitudinally moved. The cut section 140 remained in the capped sleeve 2 can be revealed by gravity after lifting the end sealing ruler 5.

Figure 6:
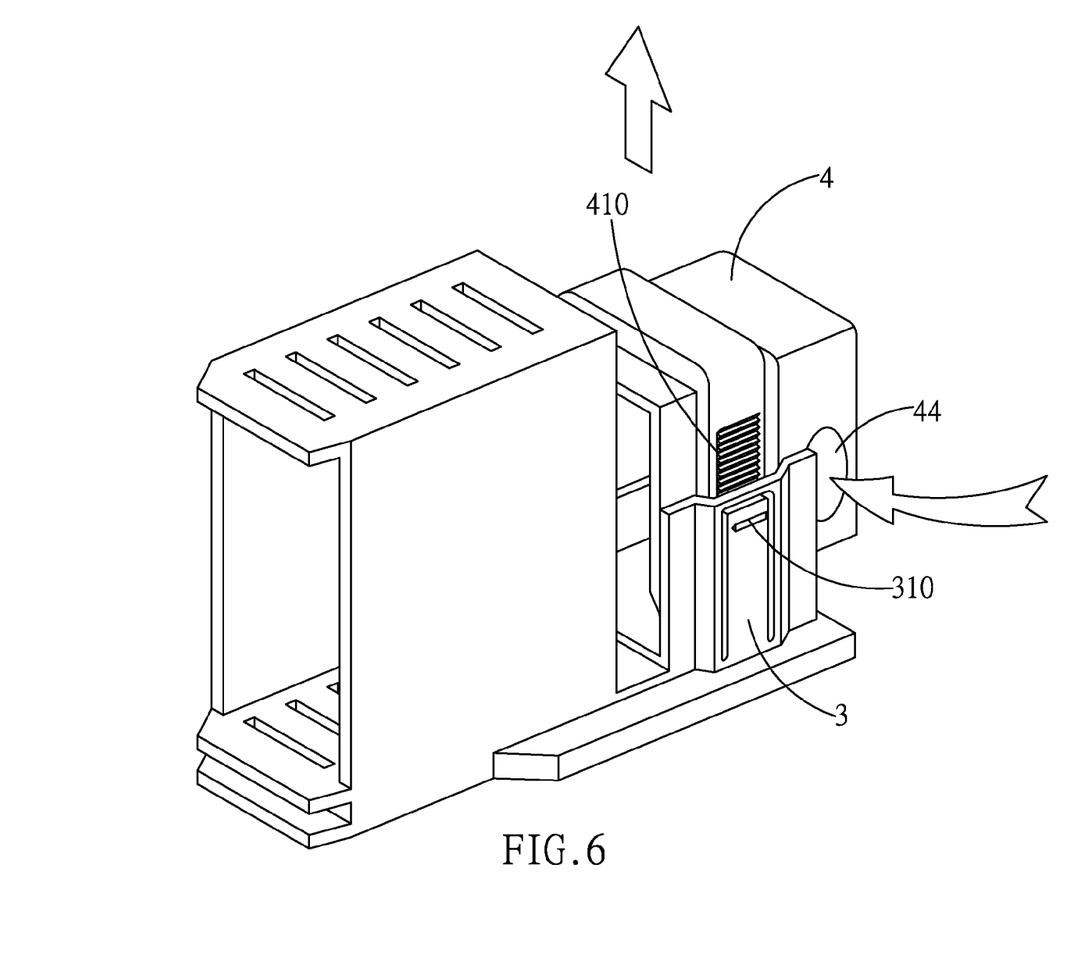
FIG. 6 is a schematic diagram of an operation of having removed a pressuring and position frame according to the present invention.

Referring to FIG. 6, the pressing and positioning frame 4 is wedged and fastened with the U-shaped pedestal 3, and the arrayed teeth 410 at the pressing and positioning frame 4 are fastened by the fastening tooth 310. To directly and vertically lift the pressing and positioning frame 4, such motion is retained by the fastening effect of the fastening tooth 310. Thus, a pressure receiving point 44 is disposed at a rear extension of the pressing and positioning frame 4. The pressure receiving point 44 may receive a lateral pressure of an external force, which generates a contraction change on a breadth of the cross plates at the two sides of the pressing and positioning frame 4 to disengage the arrayed teeth 410 from the fastening tooth 310, thereby lifting the pressing and positioning frame 4 from the U-shaped pedestal 3. For example, the pressing and positioning frame 4 may be made of a flexible plastic material with a deformation capability. Similarly, the U-shaped pedestal 3 may also be made of an equal material or a material with a greater strength. In principle, the strength of the U-shaped pedestal 3 needs to be greater than that of the pressing and positioning frame 4. However, the fastening tooth 310 needs to be able to provide a horizontal displacement effect to achieve a preferred fastening operation. Further, the pressing and positioning frame 4 is provided with an appropriate flexibility and deformation performance, in a way that the two cross plates can be contracted to disengage the pressing and positioning frame 4 from the U-shaped pedestal 3 and to lift the pressing and positioning frame 4 after applying a pressure on the pressure receiving point 44 at the rear end.

Figure 7:
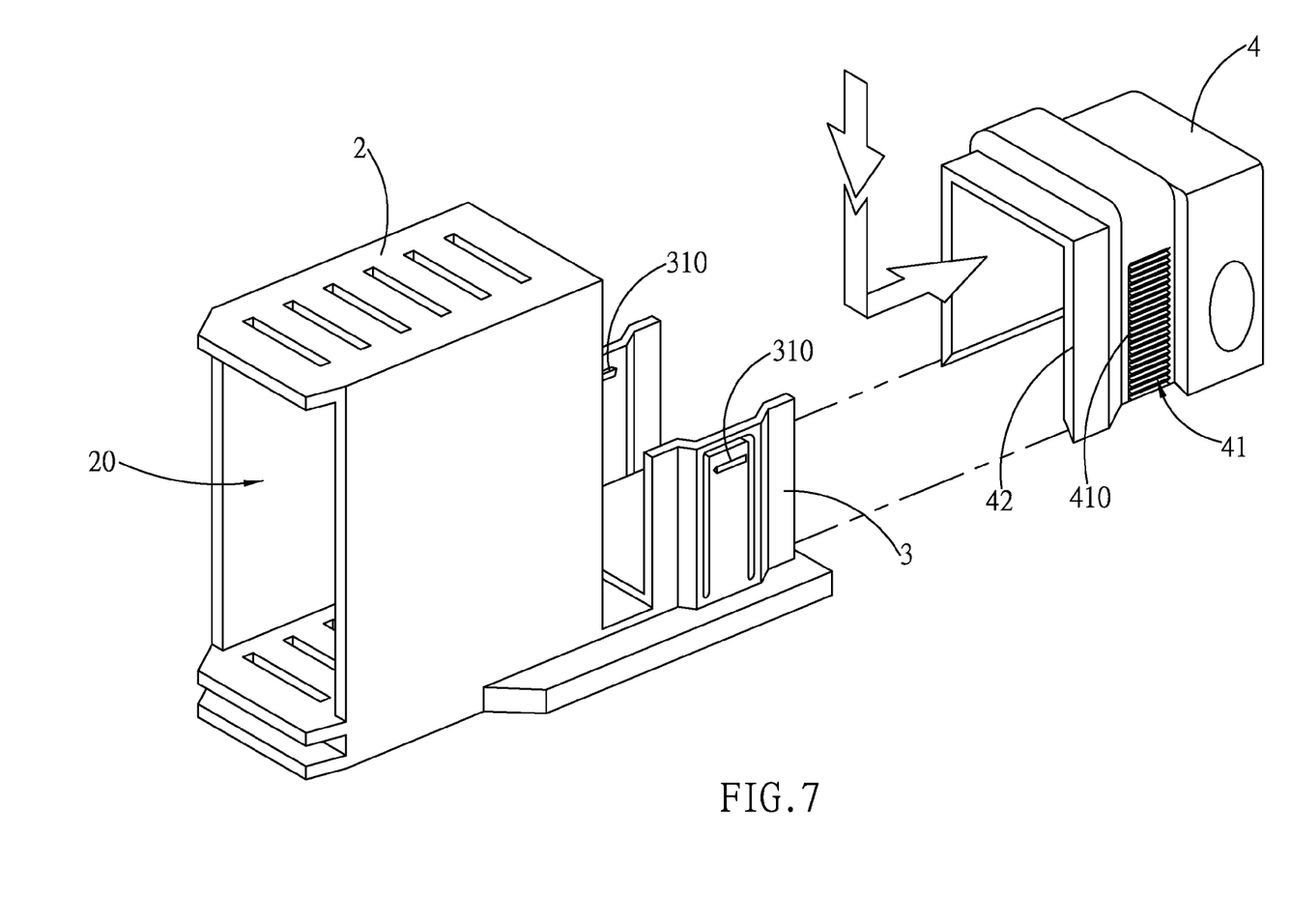
FIG. 7 is another schematic diagram of an operation of having removed a pressuring and position frame according to the present invention.

FIG. 7 illustrates a fastening and disengaging relationship between the pressing and positioning frame 4 and the U-shaped pedestal 3 according to an embodiment of the present invention. In the embodiment, the pressing and positioning frame 4 is wedged and fastened with the U-shaped pedestal 3 in a top-bottom manner, and disengaged backwards in a horizontal manner, thus achieving the assembly and disassembly of the pressing and positioning frame 4 and the U-shaped pedestal 3. In the horizontal backward disengagement, horizontal fastening teeth 310 are disposed at inner surfaces of the two vertical plates at the two sides of the U-shaped pedestal 3, and horizontal arrayed teeth 410 are formed at the pressing and positioning frame 4 to correspond to the fastening teeth 310. A top-bottom sequence of the horizontal arrayed teeth 410 forms a tooth row 41. The vertical plates at the two sides of the U-shaped pedestal 3 may be flat boards, and the cross plates at the two sides of the pressing and positioning frame 4 may similarly be flat plates. When the pressing and positioning frame 4 enters the U-shaped pedestal 3, the fastening teeth 310 are fastened with the arrayed teeth 410 of the tooth row 41. As the fastening teeth 310 are horizontal and the arrayed teeth 410 of the tooth row 41 are also a horizontal sequence, the pressing and positioning frame 4 can be easily disengaged backwards in a longitudinal direction. Such disengagement involves only a sliding movement, and is thus quite effort-saving. Further, the cross plates at the two sides of the pressing and positioning frame 4 may be crossed and fastened with external surfaces of the vertical plates at the two sides of the U-shaped pedestal 3, the fastening teeth 310 are disposed at outer surfaces (not shown) of the guide sides 42, and the tooth row 41 of the pressing and positioning frame 4 is disposed at inner surfaces of the cross plates at the two sides. Alternatively, the tooth rows 41 and the fastening teeth 310 may also be exchanged to be respectively disposed at the U-shaped pedestal 3 and the pressing and positioning frame 4. Such exchange can be determined according to actual application requirements and is not limited to a specific arrangement.

A highest internal position of the pressing and positioning frame 4 wedged and fastened with the U-shaped pedestal 3 is equal to or slightly lower than the height of the opening 20. The height of the highest position being higher than the height of the opening 20 is insignificant.

In the present invention, the capped sleeve 2 and the U-shaped pedestal 3 may be a formed integral, and may be formed by a plastic material.

The design concept of the present invention is to provide a guided cutting retainer for DIY purposes. During a cutting process, a pressing and positioning frame performs up and down vertical pressing movements on a U-shaped pedestal, and is capable of designating and preventing a stack relationship of a processed object from staggered sliding movements. Further, a blocking intervention provided by an end sealing ruler at a cross-section of a capped sleeve. Such intervention aligns an end side of the stack, such that not only a blade-feeding guide groove can provide a guided blade-feeding path for a tool, but also the stack originally aligned at the end side can achieve an aligned effect by leaning on the reference obtained from an inner breadth of the end sealing ruler. Thus, the present invention offers a compact and convenient retainer with a guiding effect for assisting a cutting process.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A guided cutting retainer for an elongated stack set, comprising:
   a capped sleeve, having a cross-section of a frame, including an internal longitudinal through opening and a cut surface as a guide side;
   a U-shaped pedestal, having vertical plates at two sides at positions parallel to frame plates at two sides of the capped sleeve, forming a mouth longitudinally in communication with the opening, horizontal fastening teeth respectively disposed at portions with flexibility and pressure capabilities at ends of the two vertical side plates;
   a base plate, longitudinally connected to lower surfaces of the capped sleeve and the U-shaped pedestal to form a vertical blade-feeding guide groove between the guide sides of the capped sleeve and guide sides of the U-shaped pedestal;
   a pressing and positioning frame, appearing similar to an inverted U shape, having two cross plates corresponding to the fastening teeth of the U-shaped pedestal and a tooth row for vertically fastening with the fastening teeth, the pressing and positioning frame capable of top-bottom wedging with the U-shaped pedestal and maintaining the guide sides of the pressing and positioning frame to be aligned with the guide sides of the U-shaped pedestal at a same cross-section.

2. The guided cutting retainer for an elongated stack set according to claim 1, wherein the tooth row of the pressing and positioning frame is disposed at a vertical linear position of a breadth of an outer surface of the cross plate, and the fastening teeth at the U-shaped pedestal are horizontally disposed at an upper end position of an inner side of the vertical plate.

3. The guided cutting retainer for an elongated stack set according to claim 1, wherein one other end of the cross plate of the pressing and positioning frame away from the guide side extends across a width of the U-shaped pedestal to be disposed with a pressure receiving point.

4. The guided cutting retainer for an elongated stack set according to claim 1, wherein a recessed vertical arch groove is provided at an inner side surface of the vertical plate of the U-shaped pedestal for an arch plate of the pressing and positioning frame to perform up and down sliding movements.

5. The guided cutting retainer for an elongated stack set according to claim 1, wherein when the U-shaped pedestal is wedged and fastened with the pressing and positioning frame, a highest internal height between the two is equal to a height of the opening of the capped sleeve.

6. The guided cutting retainer for an elongated stack set according to claim 1, wherein a spindle hole for an end sealing ruler to penetrate through is provided at an upper plate of the capped sleeve, and an insertion slot for inserting a lower end of a ruler board of the end sealing ruler is provided at a position of a lower plate of the capped sleeve at a position corresponding to the spindle hole.

7. The guided cutting retainer for an elongated stack set according to claim 6, wherein a top portion of the capped sleeve is longitudinally sequentially provided with a plurality of sequential spindle holes according to the spindle hole as a reference, and a plurality of insertion slots are provided at a lower plate of the capped sleeve at positions corresponding to the sequential spindle holes.

* * * * *